(12) United States Patent
Brandenburg et al.

(10) Patent No.: US 6,490,914 B1
(45) Date of Patent: Dec. 10, 2002

(54) METHOD OF SENSING CRANKSHAFT POSITION IN A HYBRID ELECTRIC VEHICLE

(75) Inventors: Larry Raymond Brandenburg, Plymouth, MI (US); John Michael Miller, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/048,171

(22) Filed: Mar. 25, 1998

(51) Int. Cl.$^7$ ............................................. G01M 15/00
(52) U.S. Cl. .................................................... 73/117.3
(58) Field of Search ................................ 73/116, 117.2, 73/117.3, 118.1; 340/438, 439, 441; 701/99, 101, 102, 110, 111

(56) References Cited

U.S. PATENT DOCUMENTS

| | | | |
|---|---|---|---|
| 2,857,594 A | 10/1958 | Frank et al. | |
| 3,578,888 A | 5/1971 | Adams | |
| 3,665,507 A | 5/1972 | Peil | |
| 3,975,586 A | 8/1976 | Chow et al. | |
| 4,038,688 A | 7/1977 | Chow et al. | |
| 4,091,414 A | 5/1978 | Chow | |
| 4,193,034 A | 3/1980 | Vance | |
| 4,720,638 A | 1/1988 | Vollbrecht | |
| 4,841,933 A | * 6/1989 | McHale et al. | |
| 4,864,627 A | 9/1989 | Dugan | |
| 5,177,634 A | 1/1993 | Way | |
| 5,200,899 A | * 4/1993 | Ribbens et al. | 73/116 |
| 5,239,473 A | * 8/1993 | Ribbens et al. | 73/117.3 |
| 5,268,842 A | * 12/1993 | Marston et al. | |
| 5,278,760 A | * 1/1994 | Ribbens et al. | |
| 5,323,743 A | 6/1994 | Kristiansson | |
| 5,463,898 A | * 11/1995 | Blander et al. | 73/117.3 |
| 5,476,082 A | 12/1995 | Carpenter et al. | |
| 5,481,225 A | 1/1996 | Lumsden et al. | |
| 5,548,995 A | * 8/1996 | Clinton et al. | 73/117.3 |
| 5,566,096 A | 10/1996 | Wodlinger et al. | |
| 5,606,946 A | 3/1997 | Data et al. | |
| 5,621,644 A | * 4/1997 | Carson et al. | 73/116 |
| 5,715,780 A | * 2/1998 | Haller | 73/117.3 |
| 5,743,859 A | 4/1998 | Wodlinger et al. | |
| 5,819,197 A | * 10/1998 | Fiaschetti et al. | 73/116 |
| 5,823,166 A | * 10/1998 | Entenmann et al. | 73/117.3 |
| 5,833,022 A | * 11/1998 | Welke et al. | 180/65.2 |
| 6,073,713 A | * 6/2000 | Brandenburg et al. | 180/65.2 |
| 6,150,650 A | 11/2000 | Bowden et al. | |
| 6,286,473 B1 | * 9/2001 | Zaremba | 123/192.1 |

FOREIGN PATENT DOCUMENTS

EP 0467338 1/1992

OTHER PUBLICATIONS

L.J. Giacoletto, Electronics Designers' Handbook, pp. 24–90, 24–91, 24–92, 24–93 (No date).
MX–COM, Inc., MX816 NMT Audio Processor (No date).
Universal Audio, Teletronix Leveling Amplifier Model LA–2A (No date).
Linear Technology, LT1194 Video Difference Amplifier (No date).
LMX3161 Single Chip Radio Transceiver (No date).
Aurora, The Design of Aurora's Sound Generator (No date).
The Defpom, MC13135/MC13136 FM IF–Amplifier and Discriminator (No date).
Universal Audio, The 1176 Solid State Limiting Amplifier and The Teletronix LA–2A Leveling Amplifier (No date).
Harmony Central, Compression/Limiting, http://www.harmony–central.com/Effects/Articles/Compression, accessed on Dec. 7, 2001.
The PID Algorithm, http://members.aol.com/pidcontrol/pid_algorithm.html, accessed on Dec. 7, 2001.

* cited by examiner

*Primary Examiner*—Eric S. McCall
(74) *Attorney, Agent, or Firm*—Carlos L. Hanze

(57) ABSTRACT

A method of sensing crankshaft position for use with an engine (16) having a combined starter/alternator assembly (18). The crankshaft position sensor assembly includes a tone ring (38) with a sensor (36), mounted near the rotor (30) of the combined starter/alternator assembly (18), that produces an initial crankshaft position signal. A bandpass filter (46) receives this initial signal and a cylinder identification input from a camshaft sensor (48) and filters the initial signal. Then, a gain limiter (54) performs an additional filtering process to produce a crankshaft rotational position signal. The filtered crankshaft position signal can then be input into a vehicle system controller (58) and an inner loop controller (60).

4 Claims, 5 Drawing Sheets

METHOD OF SENSING CRANKSHAFT POSITION IN A HYBRID ELECTRIC VEHICLE

FIELD OF THE INVENTION

The present invention relates to a method for sensing the crankshaft position on an internal combustion engine and more particularly on an engine having an induction type combined starter/alternator. This invention was made with Government support under Prime Contract No. DE-AC-36-83CH10093, Subcontract No. ZCB-4-13032-02, awarded by the Department of Energy. The Government has certain rights in this invention.

BACKGROUND OF THE INVENTION

For environmental and other reasons generally, there is a desire to provide for automotive vehicles that operate with propulsion system other than just a typical internal combustion engine. One such propulsion system contemplated is a purely electric vehicle. But since the technology for purely electrical vehicles is not yet practical, (e.g., there are limitations not desired by consumers), combining the electric drive with a somewhat more conventional internal combustion engine is one alternative being considered. With two drive systems in the hybrid vehicle, however, both drive systems, including the internal combustion engine, must be minimal in size.

One of the developments for reducing the overall space taken by the internal combustion engine and its accessories is to substantially reduce in size or even to eliminate the flywheel that normally mounts to the crankshaft at the rear of the engine and to locate a combined starter/alternator in this position. This will substantially reduce the space taken by separate conventional starters and alternators. For instance, an electric machine rotor of the starter/alternator can double as the conventional flywheel.

However, this now creates an electromagnetic interference (EMI) rich environment at the rear of the engine within which the crankshaft position is preferably sensed for the hybrid vehicle. The new system now requires that the sensor operate in the presence of strong electromagnetic fields beneath end turns of a stator and alongside an induction machine rotor. Current production technology, such as Hall effect or Variable Reluctance sensors (VRS), for sensing crankshaft position, then, is unusable in a combined starter/alternator system due to the significant EMI, which is not present at these levels in a conventional flywheel configuration.

To overcome this, one could relocate current crankshaft position sensors to the front of the internal combustion engine, but then the desired resolution of the crankshaft position for this hybrid configuration would be lost. This resolution is needed to more accurately control an indirect field oriented induction machine, thus making relocation an inadequate solution. Consequently, there is a desire to allow for accurate crankshaft position sensing even in an EMI rich field created by an engine with a combined starter/alternator mounted at its rear.

SUMMARY OF THE INVENTION

In its embodiments, the present invention contemplates a method of determining a crankshaft position for a rotating crankshaft in an internal combustion engine having a combined starter/alternator and a camshaft. The method comprises the steps of: rotating the crankshaft; rotating a tone wheel with indications thereon at the same angular velocity as the crankshaft; sensing the indications on the tone wheel, from a first location, as they rotate; producing an initial crankshaft position signal; rotating the camshaft; sensing the rotational position of the camshaft; producing a camshaft rotational position signal; filtering the initial crankshaft position signal based upon the camshaft rotational position signal to produce a filtered crankshaft position signal; and gain limiting the filtered crankshaft position signal to produce a crankshaft rotational position signal.

Accordingly, an object of the present invention is to allow for a preferred location for crank position sensing at the rear of the engine when employing an induction type flywheel starter/alternator system.

A further object of the present invention is to allow for accurate signal determination by employing bandpass and tracking filters, for robust sensing in the EMI rich environment around the starter/alternator.

An advantage of the present invention is that a VRS or Hall Effect Sensor can accurately measure crankshaft position even when subjected to an EMI rich environment from a hybrid electric vehicle.

DETAILED DESCRIPTION OF THE PREFERRED EMBODIMENTS

Figure 1:
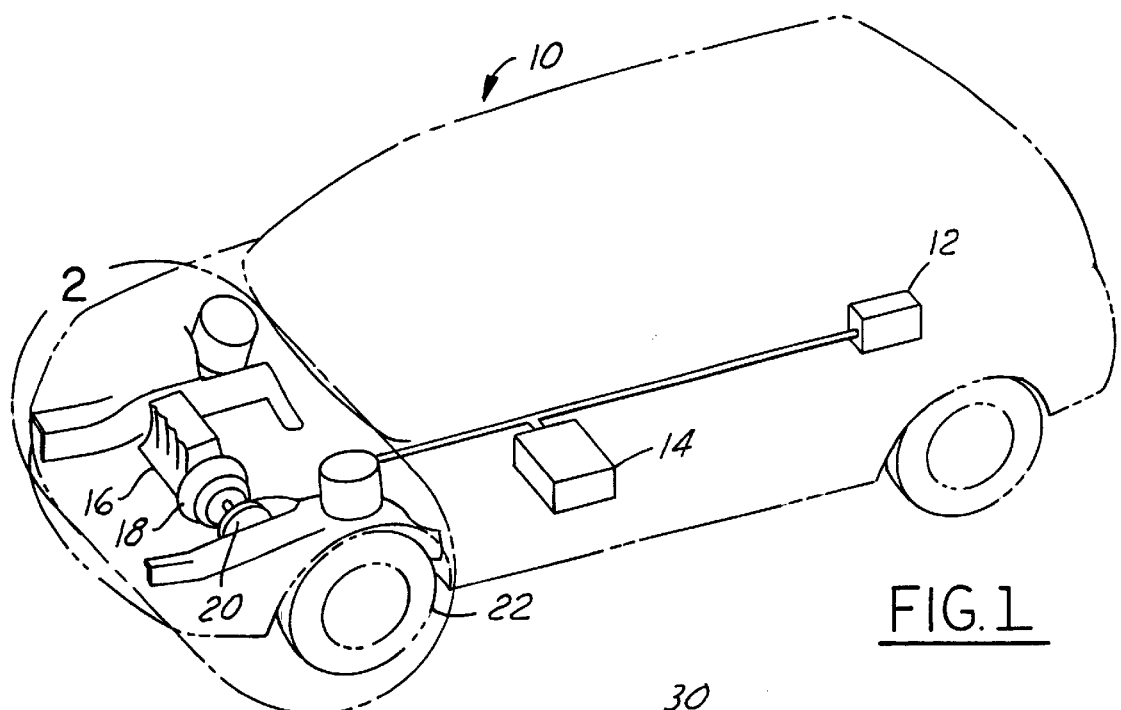
FIG. 1 is a schematic perspective view of a vehicle in accordance with the present invention.
Figure 2:
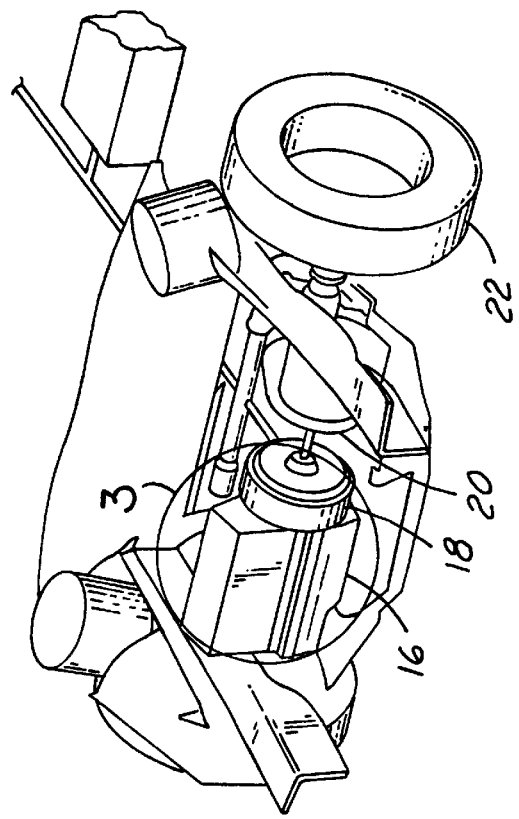
FIG. 2 is an enlarged view of encircled area 2 in FIG. 1.

FIGS. 1 and 2 illustrate a schematic of a portion of a hybrid electric vehicle 10 including an electric drive system having an inverter 12 and a battery 14. A transmission 20 is electrically connected to the inverter 12 and drive motors, not shown, in order to drive the front wheels 22. The vehicle 10 also includes a transversely mounted internal combustion engine 16, for supplying power, when needed, to charge the battery 14. Affixed to the back end of the engine 16, and driven by a rear hub portion of an engine crankshaft 26 is a starter/alternator assembly 18. This assembly 18 can act as a starter for the engine 16 and also can convert the output of the engine 16 into the electrical power that charges the battery 14.

Figure 4:
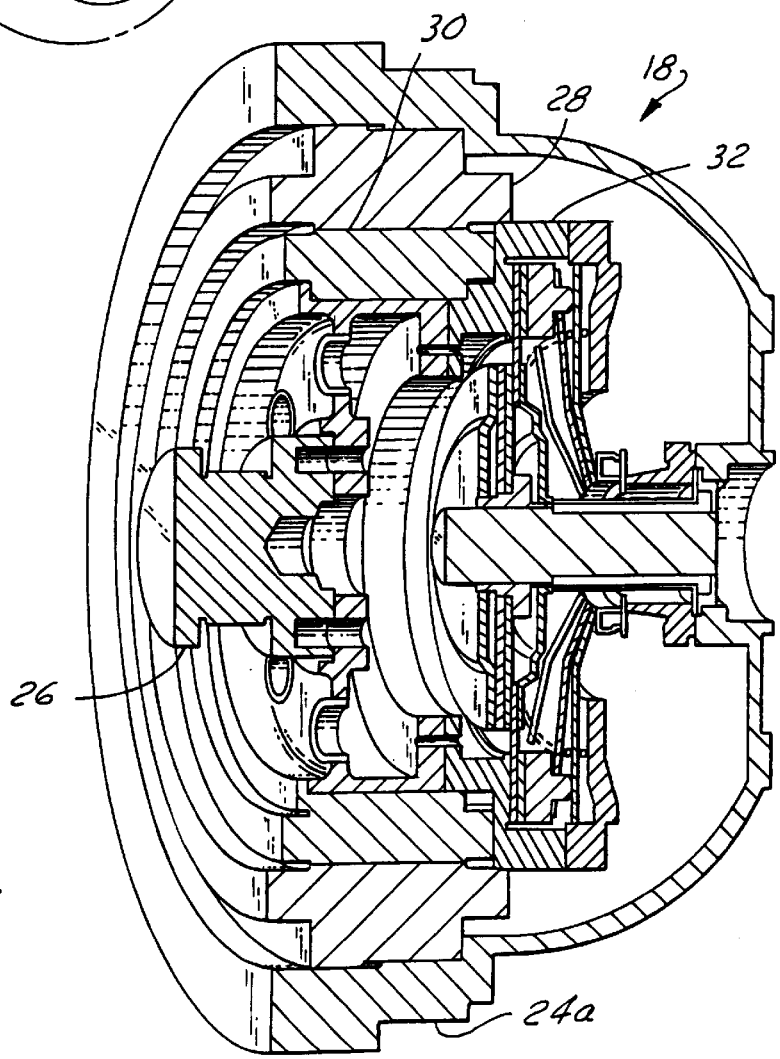
FIG. 4 is a cross-sectional view of a flywheel starter/alternator in accordance with the present invention.
Figure 3:
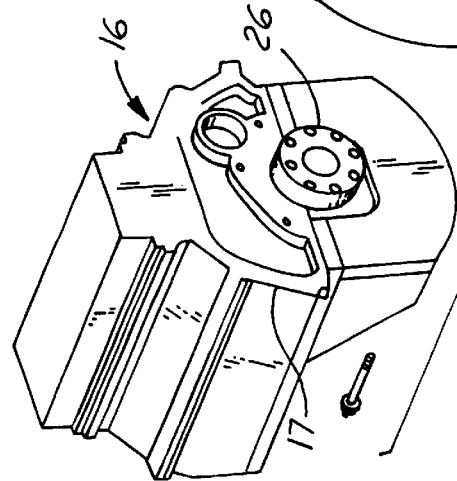
FIG. 3 is an exploded perspective view of encircled area 3 in FIG. 2.
Figure 3:
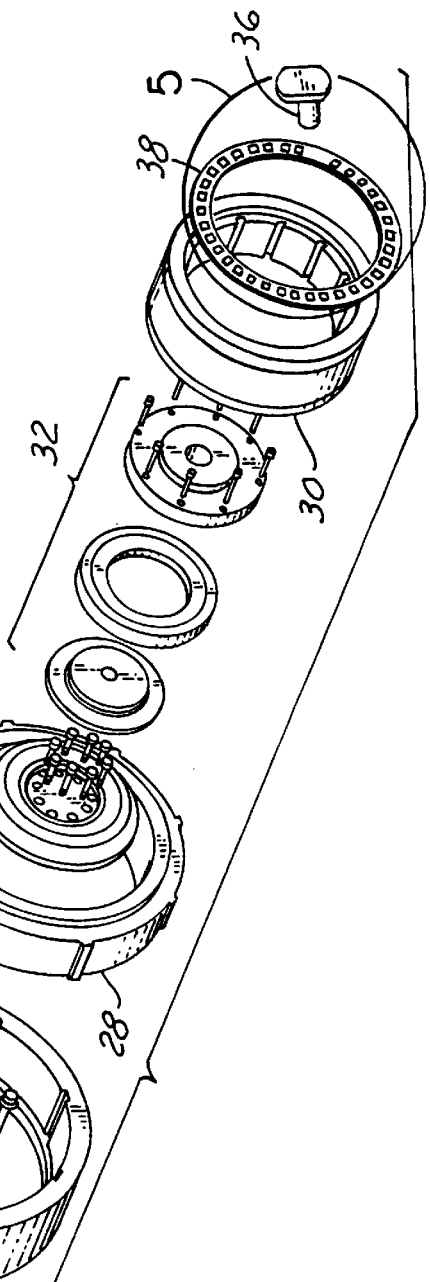
Figure 5:
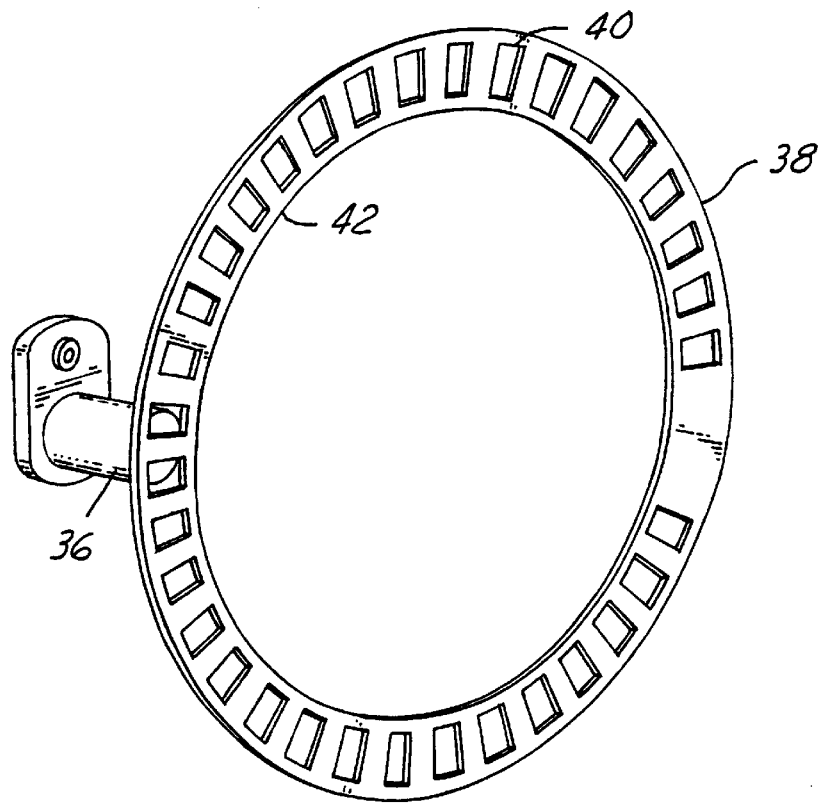
FIG. 5 is an enlarged perspective view of a tone ring and sensor as illustrated in the encircled area 5 in FIG. 3, rotated 180 degrees.

FIGS. 3–5 better illustrate the starter/alternator assembly 18. As discussed above, in order to allow for two drive systems in a hybrid electric vehicle, each must be as compact as possible. The combined starter/alternator 18 is built in an annular volume around a coaxial twin plate dry clutch 32. It includes a housing, illustrated as a bell housing 24a in FIG. 4 and as an open housing 24b in FIG. 3. The housing 24a or 24b mounts to the engine block 17 at the rear of the engine 16, around the end of the crankshaft 26.

Rotationally fixed to the inner wall of the housing 24 is a stator 28, and rotationally mounted radially within the stator 28 is a rotor 30. The rotor 30 connects to a first side of the clutch assembly 32. The second side of the clutch assembly 32 connects to the crankshaft 26. When the starter/alternator assembly 18 is acting as a starter, the first side is the driving side and the second side of the clutch 32 is the driven. When the starter/alternator assembly 18 is acting as an alternator, the second side of the clutch 32 is the driving side and the first side is the driven.

Given the compact configuration of the starter/alternator assembly 18, and hence the small diameter clutch assembly 32, a conventional crankshaft position sensor would need to be located at a short radius, requiring the sensor to be located in either the engine's oil pan or inside the engine block 17 near the engine's rear seal. With the present invention however, a crankshaft position sensor 36 is located at an intermediate radial distance from the crankshaft 26 such that it is physically possible to locate it facing into the rotor 30 and be accessible from outside the engine block 17 and oil pan. Preferably, this sensor 36 is either a variable reluctance sensor or a Hall Effect sensor.

For this location of the crankshaft position sensor 36, instead of employing holes in a flywheel as in a conventional configuration, a special tone ring 38 is employed. The tone ring 38 is preferably fabricated of lamination steel, having windows 40 cut out that approximate the slot/tooth dimensions preferred for the particular crankshaft position sensor 36 employed. The tone ring 38 illustrated herein shows a window arrangement in a conventional 36-2 pattern around its perimeter in proportions generally desirable for a VRS or Hall Effect sensor. Preferably, the inside radius 42 of the tone ring 38 matches the radius of the rotor 30, and the tone ring radial depth matches the end ring depth of the rotor 30. As for mounting, the tone ring 38 can be affixed to the rotor end ring during rotor aluminum cage casting.

Figure 6:
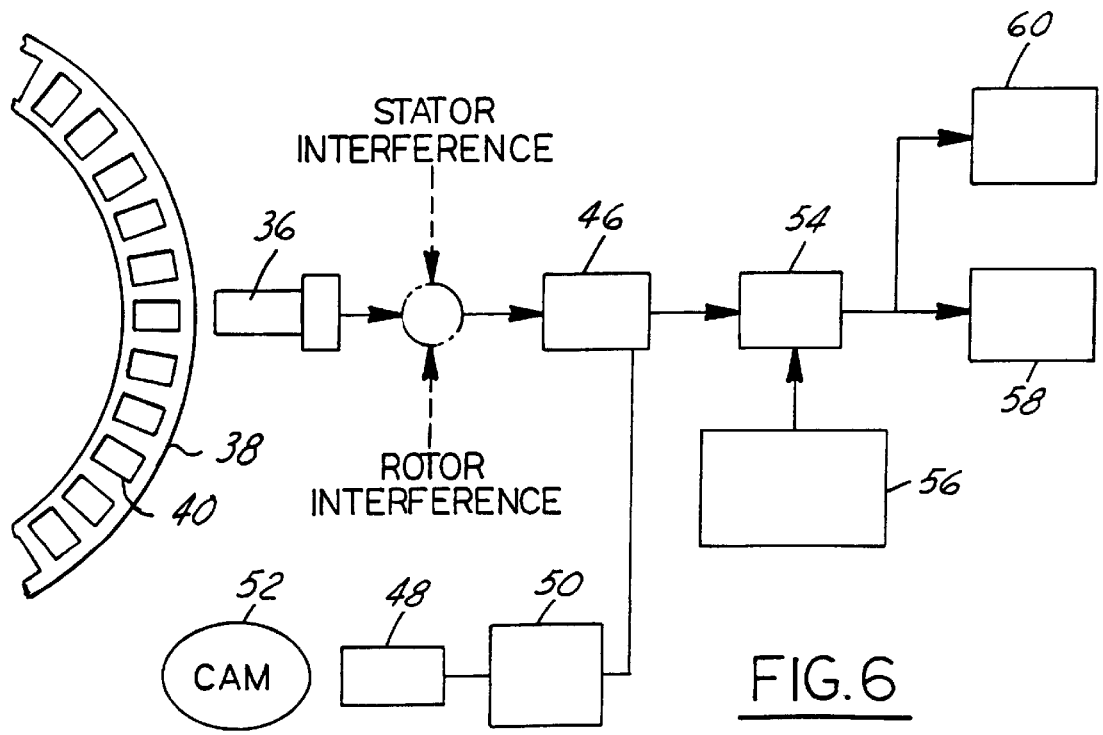
FIG. 6 is a block diagram of the circuit connected to the crankshaft position sensor in accordance with the present invention.

Turning now to FIG. 6, the crankshaft position sensor 36 and signal processing components are illustrated. These components act to extract the corrupted VRS crankshaft position signal from the EMI generated by the starter/alternator 18, illustrated in FIGS. 1–4.

Electromagnetic noise is created due to the magnetic coupling from the end turns of the stator 28 and similar fields from the rotor 30. This noise introduces a common mode component into the crankshaft position signal. (This is illustrated in phantom in FIG. 6 as stator interference and rotor interference being added to the VRS crankshaft position signal.) Additionally, the high end-ring tangential magnetic field intensity drives the tone ring 38 into saturation in special regions where the peaks of the slip current occur, and the mechanical drive frequency effect causes the crankshaft position signal to be amplitude modulated, (blurring of the tone ring windows 40). The signal processing components described below correct for these errors.

The crankshaft position sensor 36, which is located in proximity to the passing windows 40 on the tone ring 38, is electrically connected to a bandpass filter 46. The filter 46 also receives input from a camshaft cylinder identification sensor 48, through an adjustment multiplier 50 that accounts for the difference in rotational speed between a crankshaft and a camshaft. The camshaft sensor 48 reads the information from a camshaft wheel 52, as in conventional engines. The bandpass filter 46 then, is preferably of the switched capacitor type in which the center of frequency is a multiple of the cylinder identification frequency, (i.e., tracks the expected tone ring frequency and is an electromagnetic clean signal).

The output of the bandpass filter 46 is an input to a gain limiter 54, having another input for gain tracking 56, allowing for extraction of the fundamental (36-2 tooth) tone wheel information and index pulse. The output of the gain limiter 54, then, provides the filtered crankshaft rotational position signal, which is available as input to a vehicle system controller 58 and an inner loop controller 60 for the alternator/starter assembly 18.

The general operation of the system will now be described. During engine cranking the starter/alternator 18 is energized in the cranking mode with the first side of the clutch 32 driving the second side. High torque is developed and the engine crankshaft 26 is accelerated from standstill. In this cranking mode, the starter/alternator 18 starts up under open loop control until a few pulses of a cylinder identification signal from the camshaft sensor 48 are multiplied, by the multiplier 50, to match the passing frequency of the windows 40 in the tone ring 38. The signal is then filtered through the bandpass filter 46 and the gain limiter 54. Subsequently, the alternator/starter inner loop (indirect field orienter) enters closed loop control (field oriented control) by employing the signal from the inner loop controller 60. Also, the filtered crankshaft position signal is sent to the vehicle system controller 58, providing information for engine operation (such as ignition timing, etc.).

Figure 7:
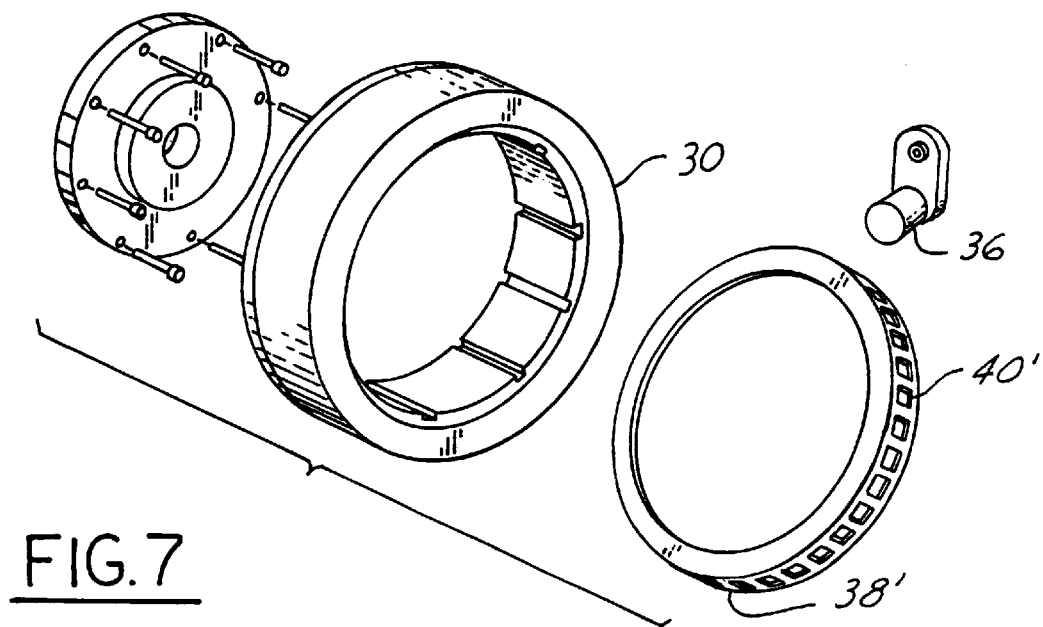
FIG. 7 is an exploded perspective view of the tone ring and sensor, similar to FIG. 3, in accordance with another embodiment of the present invention.
Figure 8:
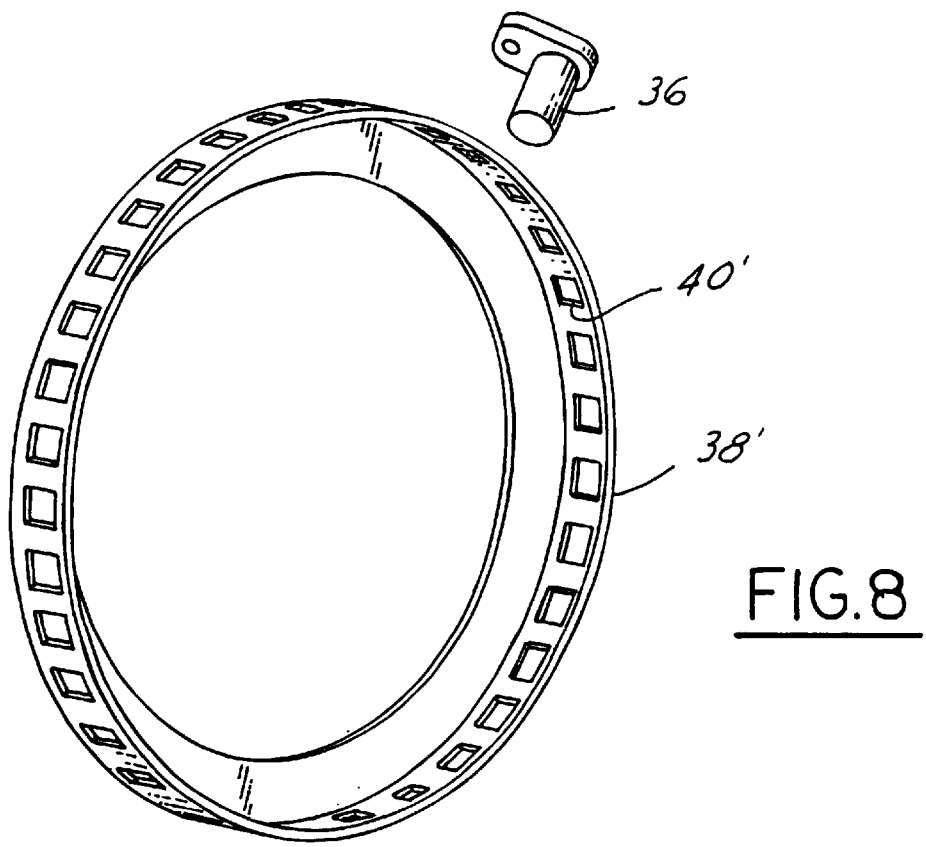
FIG. 8 is an enlarged view of the tone ring and sensor in accordance with the embodiment of FIG. 7.

An alternate embodiment illustrating a tone ring and crankshaft position sensor is shown in FIGS. 7 and 8. In this embodiment, the crankshaft position sensor 36 remains the same although it is reoriented to account for a differently shaped tone ring 38'. For this tone ring 38', the windows 40' face radially outward (around a cylindrical outer surface rather than along a circular surface as in the first embodiment) and the crankshaft position sensor 36 faces radially inward toward the windows 40'.

Figure 9:
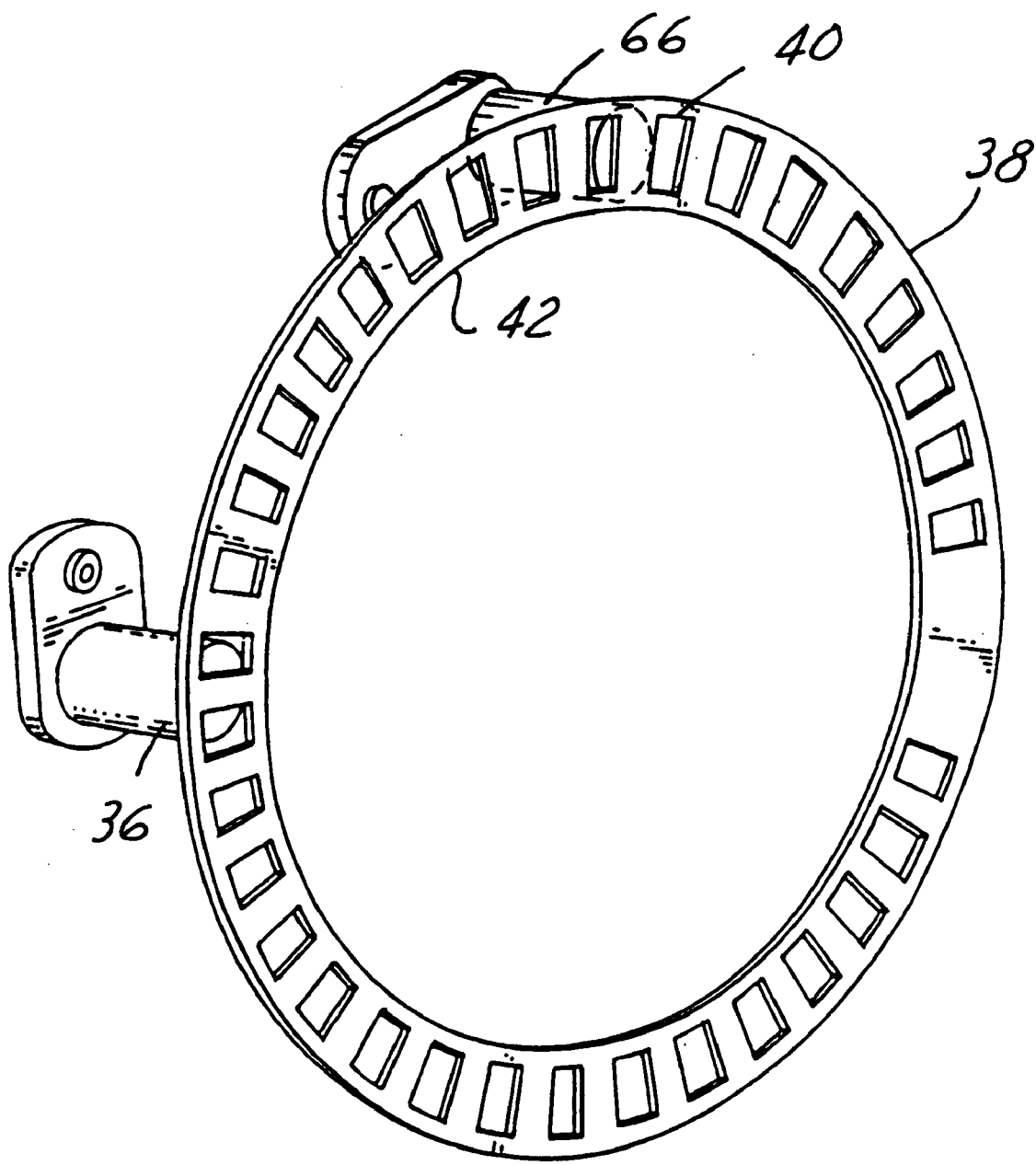
FIG. 9 is a view similar to FIG. 5, illustrating a further embodiment of the present invention.

Another embodiment is illustrated in FIG. 9. In this embodiment an additional crankshaft position sensor 66, again preferably a Hall Effect or VRS type, is mounted adjacent the tone ring, but circumferentially spaced from the first crankshaft position sensor 36. Both of the crankshaft sensors will send a signal to the bandpass filter and can be used to generate a quadrature signal and hence double the position resolution.

While certain embodiments of the present invention have been described in detail, those familiar with the art to which this invention relates will recognize various alternative designs and embodiments for practicing the invention as defined by the following claims.

We claim:
1. A method for minimizing electromagnetic interference in an output of a crankshaft position sensor of an internal combustion engine, the internal combustion engine having a camshaft and a combined starter/alternator assembly, the starter/alternator assembly having a stator, a rotor selectively coupled to the crankshaft via a clutch assembly, and a tone wheel affixed to the rotor, the method comprising:
coupling the rotor to the crankshaft;
rotating the crankshaft and thus the rotor and tone wheel affixed thereto;

using the crankshaft position sensor to detect rotation of the tone wheel and to generate an initial crankshaft position signal;

rotating the camshaft;

sensing the rotational position of the camshaft to generate a camshaft rotational position signal; and filtering the initial crankshaft position signal based upon the camshaft rotational position signal to produce a crankshaft position sensor output having minimized electromagnetic interference.

2. The method according to claim 1, further comprising the step of multiplying the camshaft rotational position signal with an adjustment multiplier prior to said filtering step.

3. The method according to claim 1, further comprising the step of energizing the starter/alternator assembly to cause rotation of the crankshaft.

4. The method according to claim 1, further comprising the step of operating the internal combustion engine to cause rotation of the crankshaft.

\* \* \* \* \*